US008235810B2

(12) United States Patent
Brunet de Courssou et al.

(10) Patent No.: US 8,235,810 B2
(45) Date of Patent: Aug. 7, 2012

(54) REGULATED GAMING TRUSTED ENERGY SAVING

(75) Inventors: Thierry Brunet de Courssou, Missilac (FR); Alexander Popovich, Henderson, NV (US); Cameron Anthony Filipour, Las Vegas, NV (US); Adam Singer, Las Vegas, NV (US)

(73) Assignee: IGT, Reno, NV (US)

(*) Notice: Subject to any disclaimer, the term of this patent is extended or adjusted under 35 U.S.C. 154(b) by 606 days.

(21) Appl. No.: 12/395,637

(22) Filed: Feb. 28, 2009

(65) Prior Publication Data

US 2009/0221363 A1 Sep. 3, 2009

Related U.S. Application Data

(60) Provisional application No. 61/067,924, filed on Mar. 2, 2008.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |
| ***G06F 1/26*** | (2006.01) |
| ***G06F 1/32*** | (2006.01) |

(52) U.S. Cl. .................. 463/29; 463/1; 463/25; 463/40; 463/41; 463/42; 713/320; 713/321; 713/322; 713/323; 713/324

(58) Field of Classification Search ................ 463/1, 25, 463/29, 40–42; 713/320–340
See application file for complete search history.

(56) References Cited

U.S. PATENT DOCUMENTS 5,361,982 A 11/1994 Liebl et al.

(Continued)

FOREIGN PATENT DOCUMENTS

WO 2007129593 11/2007

(Continued)

OTHER PUBLICATIONS

International Search Report and Written Opinion of Jul. 2, 2009 in corresponding PCT application PCT/US09/35611.

(Continued)

*Primary Examiner* — Ha Tran T Nguyen
*Assistant Examiner* — Karen Kusumakar
(74) *Attorney, Agent, or Firm* — Clise, Billion & Cyr, P.A.; Richard E. Billion

(57) ABSTRACT

Trusted Energy Saving (TES) methods applied to server based distributed downloadable gaming for allowing casino operators to significantly reduce their energy bills by placing the main controller of selected unused gaining machines into low-power mode while retaining total control and trust. Trusted Energy Saving is accomplished by: (1) establishing a secure "out-of-band" communication (or equivalent) between gaming machines and the casino's management system such that full network security is maintained while the main controller is in low power standby mode, (2) employing intelligent strategies to wake-up and turn-off the main controller of selected gaming machines by anticipating player use, (3) waiving the lengthy security verification required by regulation upon every gaming machine start-up and optionally (4) by displaying video promotional content on each turned-off gaming machine to continue to attract prospective players and to use the timing of each player approach to intelligently structure game menus based on the promotional content that has successfully attracted the player. The mapping of the TES gaming machines that are turned-on and in low-power mode may be periodically forwarded to the air-conditioning management system and/or to the lighting management system for energy optimization.

32 Claims, 8 Drawing Sheets

Trusted Energy Saving Mode

U.S. PATENT DOCUMENTS

| | | | | |
|---|---|---|---|---|
| 5,668,446 | A | 9/1997 | Baker | |
| 5,770,533 | A | 6/1998 | Franchi | |
| 5,962,989 | A | 10/1999 | Baker | |
| 6,135,884 | A | 10/2000 | Hedrick et al. | |
| 6,374,145 | B1 | 4/2002 | Lignoul | |
| 6,611,917 | B1 | 8/2003 | Yahara | |
| 7,263,622 | B2 | 8/2007 | Ohba | |
| 2002/0032051 | A1 * | 3/2002 | Stockdale | 463/29 |
| 2002/0115487 | A1 | 8/2002 | Wells | |
| 2003/0092493 | A1 * | 5/2003 | Shimizu et al. | 463/43 |
| 2003/0190962 | A1 | 10/2003 | Canterbury | |
| 2005/0010738 | A1 * | 1/2005 | Stockdale et al. | 711/170 |
| 2005/0015632 | A1 * | 1/2005 | Chheda et al. | 713/300 |
| 2005/0149773 | A1 | 7/2005 | Kevan | |
| 2006/0053324 | A1 * | 3/2006 | Giat et al. | 713/300 |
| 2006/0143583 | A1 * | 6/2006 | Diab et al. | 716/4 |
| 2006/0205514 | A1 | 9/2006 | Cockerille | |
| 2006/0287111 | A1 | 12/2006 | Mitchell et al. | |
| 2007/0030613 | A1 * | 2/2007 | Sousa et al. | 361/92 |
| 2007/0066390 | A1 | 3/2007 | Matsuno | |
| 2008/0026854 | A1 | 1/2008 | Chen et al. | |
| 2008/0070652 | A1 | 3/2008 | Nguyen | |
| 2008/0270814 | A1 * | 10/2008 | Starr et al. | 713/323 |

FOREIGN PATENT DOCUMENTS

| | | |
|---|---|---|
| WO | 2008060514 | 5/2008 |

OTHER PUBLICATIONS

Trusted Computing Group whitepaper: Trusted Platform Modules Strengthen User and Platform Authenticity, Jan. 2005, Copyright © 2005 Trusted Computing Group (8 pages).

* cited by examiner

Trusted Energy Saving Mode

REGULATED GAMING TRUSTED ENERGY SAVING

BACKGROUND OF THE INVENTION

Embodiments of the present inventions relate generally to the field of regulated pay computer-controlled games, either pay-for-play (e.g. entertainment arcades, amusement arcades) or pay-for-wager (e.g. casino, video lottery. Fixed Odds Betting gaming machines or FOBT).

SUMMARY OF THE INVENTION

Methods and Systems for Trusted Energy Saving according to embodiments of the present inventions leverage the assignee Cyberview Technology Inc/s Secure Game Download technology disclosed in commonly assigned and co-pending U.S. patent application Ser. No. 10/520,831 filed on Aug. 12, 2005, which US application claims priority to international application PCT/US02/29927 and to U.S. provisional patent application Ser. No. 60/393,892 filed on Jul. 5, 2002, and allows casino operators to save money and operate in an environmentally conscious manner by limiting the power consumption of gaming machines that are not in use. Legacy gaming machines (i.e., gaming machines not configured according to an embodiment of the present invention) are unable to maintain communication with a casino's management system when powered off (e.g., powered-off or in a low-power standby mode in which secure communication with the main controller is unavailable) and therefore lack security (as the server can no longer monitor the non-communicating gaming machine which may have been powered-off, carted away, may be communicating with a non-authorized network node, may be or have been subjected to off-line attacks, etc.). In contrast, server-based gaming machines equipped for Trusted Energy Savings according to embodiments of the present invention are able to maintain an Intel Advanced Management Technology (AMT) "out-of-band" communication (or equivalent communication) and retain full network security while in a powered off mode. As the casino's management system is continually and securely communicating with the gaming machine even when the gaming machine is in low power mode (or appears turned-off to outside observers), security is not compromised. Consequently, lengthy security verifications (required by gaming regulations upon every gaming machine start-up) may be waived to enable the gaming machine to perform a rapid start-up and accept a wager from a player without delay.

From a marketing perspective, gaming machines equipped for Trusted Energy Savings (abbreviated to TES hereafter) according to embodiments of the present invention do not lose their ability to attract players by appearing to be turned off. Instead, their cabinets may remain illuminated and one of more of their gaming screens may run promotional content that is sourced by a low power media player (that may receive media from the central server, for example).

Unlike legacy gaming machines, which typically feature a single gaming title per gaming machine (requiring a player to check as many as 3,000 gaming machines on the casino floor to find a specific game), TES-enabled server-based games allow players to access an entire gaming library of hundreds or even thousands of games on each gaming machine. It is the very nature of server-based games that unexpectedly makes TES possible. Indeed, whereas a casino operator using legacy gaming machines would be reluctant to power off a percentage of his gaming machines and consequently render a corresponding percentage of the gaming titles in his library unavailable to players, a casino operator using server-based gaming machines may power off or down any number of TES-enabled gaming machines and not restrict the players' ability to access the full panoply of games in the casino's rich game library.

TES-enabled gaming machines may use a variety of methods to anticipate use in standby or power-down mode. According to one method, each bank of games on a casino floor (usually 8 gaming machines per bank) may feature one fully powered up gaming machine at all times. Whenever a player initiates play on a powered up gaming machine, one or more of the other gaming machines in the bank that are in TES-enabled mode may rapidly wake up so that any new player approaching the game bank may be accommodated. Whenever a player approaches a powered down gaming machine, a specifically identified button (or any of the gaming machine buttons if configured accordingly) may be activated by a player such, this gaming machine and more of the other gaming machines in the bank that are in TES-enabled mode may rapidly wake up. According to another embodiment, the gaming machine may use previous play history to determine future behavior, such that popular gaming machines are more likely to be fully powered up than less popular games. In a third method, motion detectors may be used to anticipate game play. When the motion detector(s) detect movement in the vicinity of a bank of gaming machine, one or more gaming machines may rapidly wake-up (i.e., perform a rapid boot up procedure), exiting TES low-power mode, entering a fully powered up state, bypassing the lengthy regulatory verification and returning to fully operational state.

Accordingly, an embodiment of the present invention is a gaming machine, comprising a game controller and an interactivity apparatus to accept wagers from a player and to provide random outcomes while playing a game, the interactivity apparatus including a first video display; a primary power supply configured to provide power to the game controller; a first mode in which the gaming machine draws power only from the primary power supply and in which, the gaming machine is fully powered up and available for immediate game play; a first communication channel configured to maintain communication between the gaming machine and a remote computer when the gaming machine is in the first mode; a secondary power supply that is separate from and independent of the primary power supply; a second mode in which the gaming machine draws power only from the secondary power supply and consumes less power than in the first mode and in which the gaming machine is not available for immediate game play; a second communication channel that is separate from and independent of the first communication channel, the second communication channel being configured to maintain communication between the gaming machine and the remote computer when the gaming machine is in the second mode; at least one of logic and circuitry for selectively activating the first mode and the second mode.

According to further embodiments, the first communication channel and the second communication channel may be provided on a same physical cabling. The gaming machine may also include a low power computer that is separate from and independent of the game controller, the low power computer being powered by the second power supply. The first video display may include a first video input port and a second video input port. The game controller may be configured to be coupled to the first video input port of the first video display when the gaming machine is in the first mode. The low power computer may include a video output configured to be coupled to the second video input port of the first video display when the gaming machine is in the second mode. The gaming machine may be further configured to receive, over the second communication channel, a command instructing the gaming machine to switch from the second mode to the first mode and, responsive to receiving the command, to switch from the second mode to the first mode. The gaming machine may further include an alarm system coupled to the low power computer, the alarm system being configured to detect intrusions and to provide alerts upon detection thereof when the gaining machine is in the first mode or tire second mode. The gaming machine may further include a detector configured to trigger when a player approaches or is near the gaming machine, the gaming machine being further configured to switch, from the second mode to the first mode when the detector detects that a player is approaching or is near the gaming machine. The low power computer may be configured to cause the first video display to display content when the gaming machine is in tire second mode. The low power computer may be further coupled to a second video display disposed adjacent to the gaming machine, the low power computer being configured to cause the second video display to display content when the gaming machine is in the second mode. When the gaming machine is in the second mode, the first video display may be configured to display previews of games available on the gaming machine, and tire gaming machine may be further configured to enable game play of a game whose preview was shown on the first video display when the detector was triggered. When the gaming machine is in the second mode, the first video display may be configured to display previews of games available on the gaming machine, and the gaming machine may be further configured to show a menu of a predetermined number of the last games whose previews were shown on the first video display when or shortly before the detector was triggered. When the gaming machine is in the second mode, the first video display may be configured to display previews of games available on the gaming machine, and the gaming machine may be further configured to show a menu of games available on tire gaming machine when the detector is triggered.

Another embodiment of the present invention is a method, comprising steps of providing a gaming machine, the gaming machine comprising a game controller and an interactivity apparatus to accept wagers from a player and to provide random outcomes while playing a game, the interactivity apparatus including a first video display; providing a primary power supply configured to provide power to the game controller and providing a secondary power supply that is separate from and independent of the primary power supply; selecting between a first mode in which the gaming machine draws power only from the primary power supply and in which the gaming machine is fully powered up and available for immediate game play and a second mode in which the gaming machine draws power only from the secondary power supply and consumes less power than in the first mode and in which the gaming machine is not available for immediate game play; enabling a first communication channel when the gaming machine is in the first mode, the first communication channel being configured to maintain communication between the gaming machine and a remote computer when the gaining machine is in the first mode, and enabling a second communication channel when the gaming machine is in the second mode, the second communication channel being separate from and independent of the first communication channel, the second communication channel being configured to maintain communication between the gaming machine and the remote computer when the gaming machine is in the second mode.

According to further embodiments, the method may further include a step of providing the first communication channel and the second communication channel on the same physical cabling. The gaming machine providing step may be carried out with the gaming machine further including a low power computer that is separate from and independent of the game controller, the low power computer being powered by the second power supply. The gaming machine providing step may be earned out with the first video display including a first video input port and a second video input port. The method may also include a step of coupling the game controller to the first video input port of the first video display when the gaming machine is in the first mode. The low power computer may include a video output and the method further may include a step of coupling the video output to the second video input port of the first video display when the gaining machine is in the second mode. The method may also include steps of receiving, over the second communication channel, a command instructing the gaming machine to switch from the second mode to the first mode and, responsive to receiving the command, switching from the second mode to the first mode. The gaming machine providing step may be earned out with the gaming machine further including an alarm system coupled to the low power computer, and the method may further include the step of the alarm system detecting intrusions and providing alerts upon detection thereof when the gaming machine is in at least the second mode. The gaming machine providing step may be carried out with the gaming machine further including a detector configured to trigger when a player approaches or is near the gaming machine, and the method may further include the step of switching from the second mode to the first mode when the detector detects that a player may be approaching or may be near the gaming machine. The method may further include a step of the low power computer causing the first video display to display promotional material when the gaming machine is in the second mode. The method may also include the steps of providing a second video display adjacent to the gaming machine and coupling the low power computer to the second video display, and configuring the low power computer to cause the second video display to display promotional material when the gaming machine is in the second mode. When the gaming machine is in the second mode, the method further may include steps of displaying, on the first video display, previews of games available on the gaming machine, and enabling game play of a game whose preview was shown on the first video display when the detector was triggered. When the gaming machine is in the second mode, the first video display may be configured to display previews of games available on the gaming machine, and the gaming machine may be further configured to show a menu of a predetermined number of the last games whose previews were shown on the first video display when or shortly before the detector was triggered. When the gaming machine is in the second mode, the first video display may be configured to display previews of games available on the gaming machine, and the gaming machine may be further configured to show a menu of games available on the gaming machine when the detector is triggered.

According to yet another embodiment, the present invention is a method, comprising providing a bank of gaming machines, the bank of gaming machines including a plurality of gaming machines, each of the plurality of gaming machines being selectably operable in a full power operating mode in which game play is enabled and in a reduced power mode in which game play is not enabled; controlling the bank of gaming machines such that one more gaming machine than is currently in use is operating in full power mode, remaining ones of the bank of gaming machines being controlled to operate in the reduced power mode; providing a detector configured to detect a player next to one of the plurality of gaming machines or approaching the bank of gaming machines; responsive to the detector triggering, powering up at least one additional gaming machine of the bank of gaming machines from the reduced power mode to the full power mode.

The powering up step may power up all remaining gaming machines of the bank of gaming machines from the reduced power mode to the full power mode. Alternatively, the powering up step may power up only a portion of the gaming machines of the bank of gaming machines, the controlling step controlling remaining ones of the gaming machines of the bank of gaming machines to operate in the reduced power mode.

BRIEF DESCRIPTION OF THE DRAWINGS

Prior Art FIG. 1A demonstrates the insecure status of a bank of traditional gaming machines in which three gaming machines are powered on and one gaming machine is powered off.

DETAILED DESCRIPTION

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Figure 1A:
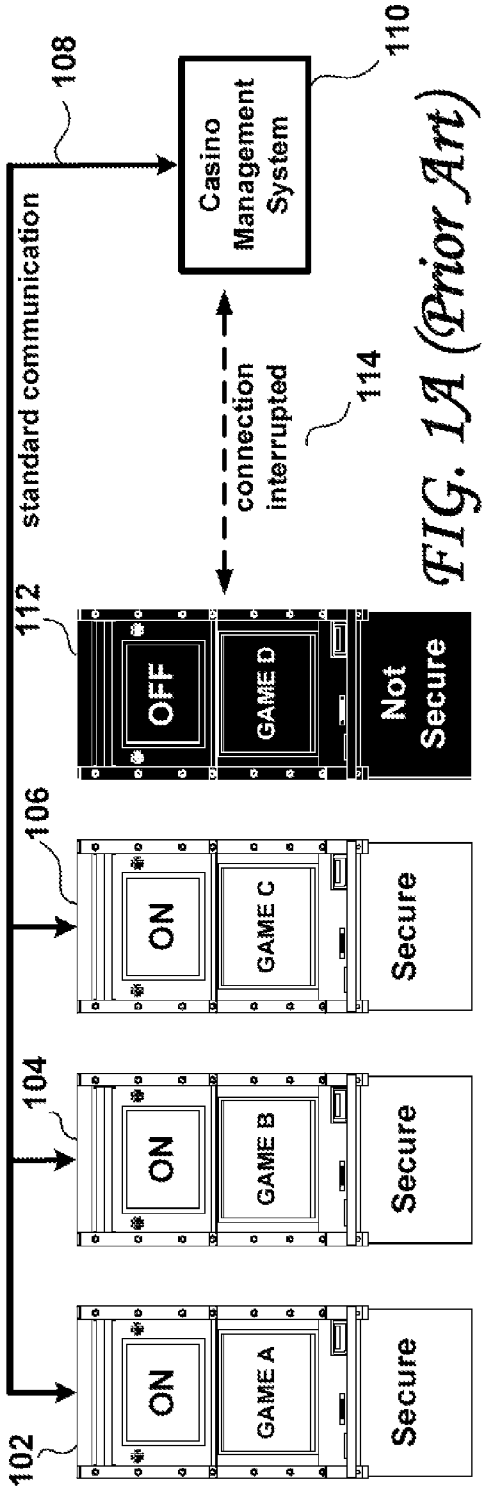
FIG. 1A (Prior Art)
FIG. 1B demonstrates tire fully secure status of a bank of TES gaming machines in which one gaming machine is powered on and three gaming machines are in standby mode, powered off or powered down.

Prior Art FIG. 1A shows the insecure status of a bank of traditional gaming machines in which three gaming machines are powered on and one gaming machine is powered off. Legacy standalone gaming machines that are powered on such as gaming machine 102, gaming machine 104, and gaming machine 106 maintain a connection 108 to the casino's management system 110 that allows game operators to communicate with the gaming machines and continuously verify their status. When a gaming machine is powered off in this model, such as is gaming machine 112, the connection to the casino's management system 110 is interrupted 114 and critical information about the gaming machine's status becomes unavailable to the casino operator. In this powered down state, the gaming machine cannot be considered secure, as the server can no longer monitor the non-communicating gaming machine which, may have been powered-off, carted away, may be communicating with a non-authorized network node, may be or have been subjected to off-line attacks such as boot-kit attacks, memory attacks (by freezing), and the like.

It should also be noted that legacy standalone gaming machines often feature a single gaming title per gaming machine. In this mode, gaming machine 102 might feature a jungle themed slot game (referenced as "Game A" in FIG. 1A), gaming machine 104 might feature an underwater themed slot game (referenced as "Game B" in FIG. 1A), gaming machine 106 might feature a gold rush themed slot game (referenced as "Game C" in FIG. 1A), and gaming machine 112 might feature an ancient Egypt themed slot game (referenced as "Game D" in FIG. 1A), for example. Because gaming machine 112 is powered off, customers seeking an ancient Egypt themed game in this bank of games would not have access to such a title, with consequent loss of revenue to the casino.

Because of the limitations described above; namely, lack of security, the potential reduction of gaming choices for the player and revenue for the casino, game operators are reluctant to maintain gaming machines on their casino floor in any other than a fully powered on state.

Figure 1B:
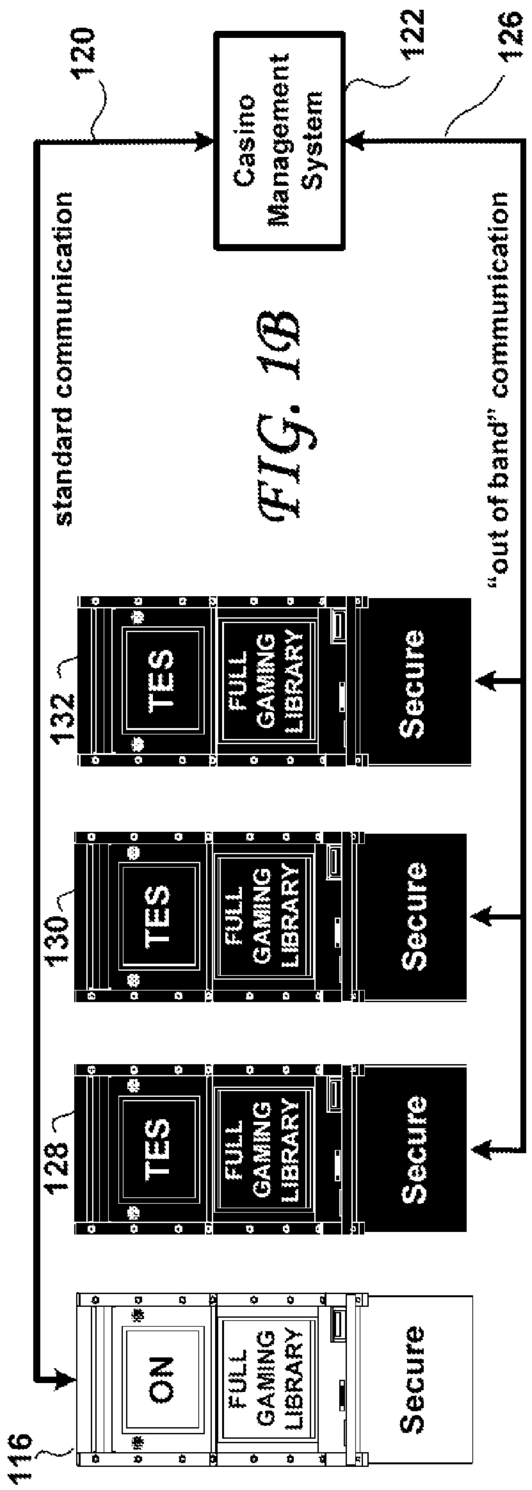

FIG. 1B demonstrates the fully secure status of a bank of TES-enabled gaming machines in which one gaming machine is powered on and three gaming machines are powered off, according to an embodiment of the present invention. It is to be noted that, within the context of the present invention, terms such as "powered off", "powered down" and "standby" are used interchangeably and are individually and collectively intended to convey a state of a regulated or unregulated gaming machine that is less than fully powered on and immediately available for game play. The gaming machine 116 that is powered on in FIG. 1B in this server-based, TBS-enabled model may maintain communication with the casino's management system 122 via standard communication 120, which is the same standard communication 108 used in FIG. 1A.

Incorporating a casino management system with game download capability into this architecture allows the game operator increased flexibility. Whereas each standalone gaming machine 102, 104, 106 and 112 in FIG. 1A features a single gaming title, all gaming machines 116, 128, 130 and 132 in FIG. 1B connect to the casino's management system and thus have access to any title in the casino's gaming library that the operator wishes to make available. This feature allows game operators to power off games on the casino floor without limiting players' gaming choices. Of course, single-game gaming machines may also be TES-enabled.

According to embodiments of the present invention, the gaming machines 116, 128, 130 and 132 in FIG. 1B, configured for TES, may each be configured to include a primary power supply and a standby power supply, each power supply receiving power from tire gaming facility mains power (usually 110 VAC but may also be DC). The primary power supply and the standby power supply may be turned on and off independently. The standby power supply typically provides power to electronic circuits that consume little energy and usually never needs to be turned-off (although they may be turned off to clear an abnormal electronic latch-up condition). The standby power supply may include a battery backup that provides power even when the mains power supply is switched off or when the mains power plug of the gaming machine is removed. When turned-on, the primary power supply powers the gaming machine's main computer that controls the games and communicates with the casino management system via the standard communication 120. According to embodiments of the present invention, to save energy when a gaming machine is not being actively played by a player, a command may be sent to the idle gaming machine's primary power supply, the command causing the gaming machine to turn off its primary power supply while maintaining its standby power supply turned on. When the primary power supply is turned-off, the main controller is inoperative and unable to communicate with the casino management system via the standard communication 120. In an embodiment of the invention, the standby power supply provides power to standby electronics mat remain operative when the primary power supply of the gaming machine is turned-off. These standby electronics may include electronics control circuits to wake up (or turn on) the primary power supply upon an event or a command. Such a wake-up scheme is very common in modern PC computers labeled "Green-PC" as well as in laptops, and is commonly called "Hibernate," "Sleep," or "Standby" mode. Generally, system administrators may wake-up network connected PCs left in standby mode by sending a "magic cookie" via the standard communication network (e.g. Ethernet); subsequent to being waken-up, the PCs may then start communicating with a central management system. A magic cookie is a token or short packet of data passed over the network mat is examined by standard network interfaces that are in standby mode. The magic cookie contains a unique address mat is recognized by a corresponding network interface that will wake-up the computer by sending a turn-on command to the primary power supply. However, the magic cookie is not a mechanism that allows network communication when the primary power supply in off between the PC and a central system.

The standby electronics of the gaming machines configured with TES according to embodiments of the present invention may also include electronics control circuits and network interface circuits to enable "out-of-band" secure communication 126 between the gaming machines 128, 130 and 132 and the casino management system 122 even when tire respective primary power supplies of the gaming machines 128, 130 and 132 are turned off. A communication is called "out-of-band" when it is independent of the standard communication. The standard and out-of-band communications are independent of one another: if the standard communication is inoperative for any reason, the out-of-band communication is not affected. The out-of-band communication relies on a network 126 that is separate from the standard network 120 such that the network interface electronics that are necessary to maintain communication with the casino management system 122 are powered by a standby power supply that is separate from the primary power supply of the gaming machine. Recall that tire primary power supply provides power to the gaming machine's main controller. Consequently, when the primary power supply is turned off, the main controller is inoperative. In such a case (i.e., when the gaming machine's primary power supply is turned off), tire standby power supply provides power to the network interface electronics associated with the out-of-band communication. In later generation computer technology such, as the Intel® vPro™ (or LaGrande) architecture, standard communication and out-of-band communication may occur on the same physical network cabling and via the same network interface electronics. This network communication technology available in vPro™ is called Advanced Management Technology (AMT) and allows computers to perform essential administration functions from a central system even when the computer's primary power supply is off (but the standby power supply is on) over the standard communication network infrastructure.

Figure 2:
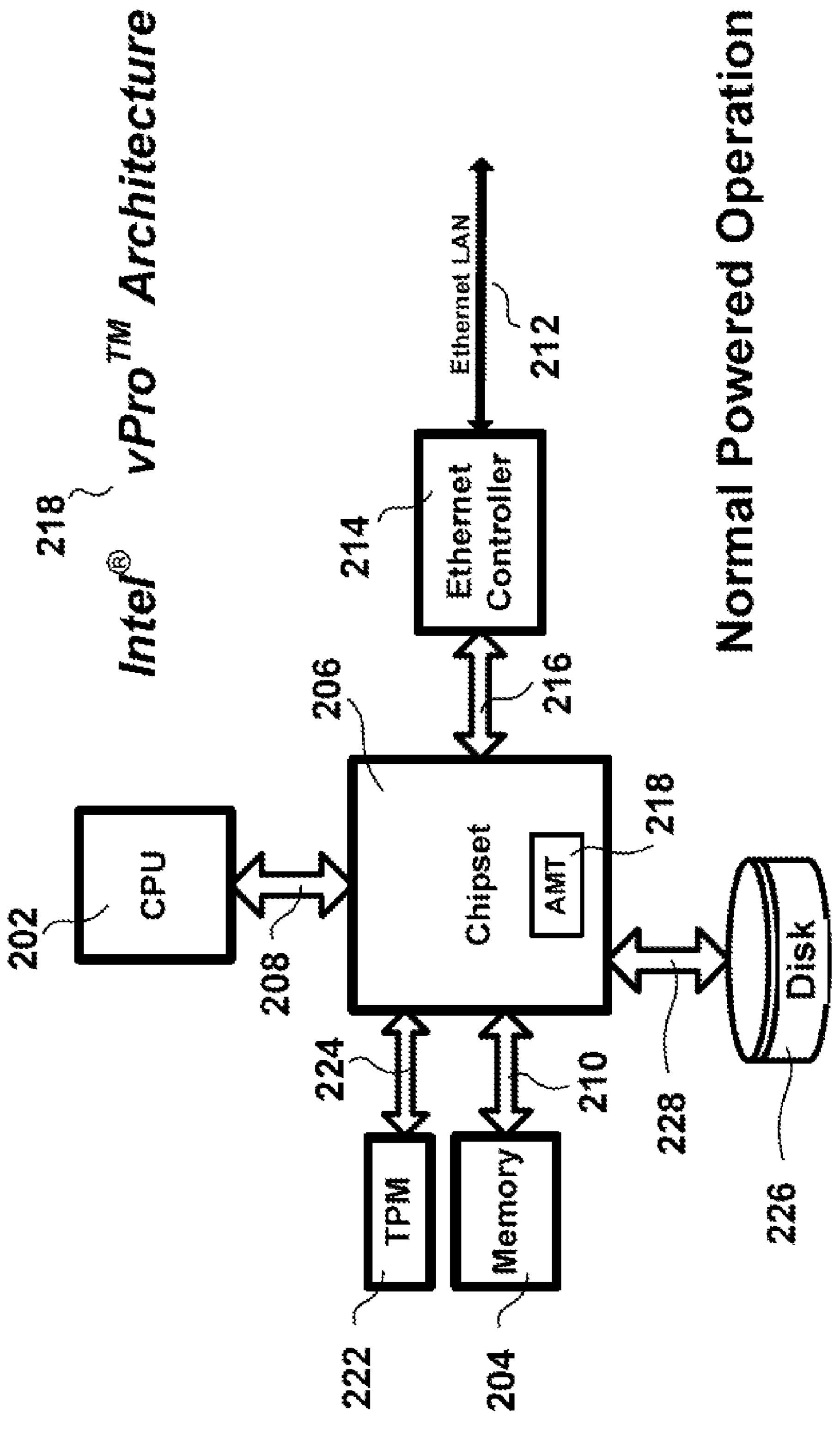
FIG. 2 (Prior Art)
FIG. 2 illustrates the Intel vPro architecture in normal powered operation.

FIG. 2 illustrates the Intel® vPro™ architecture in normal powered mode when the primary power supply is turned-on. The CPU 202 communicates with the working memory (e.g., DRAM) 204 via the chipset 206 in order to execute program instructions retrieved from mass memory (e.g., Disk or Flash) 226. The chipset 206 may comprise several integrated circuits (e.g. North Bridge, South Bridge, Memory Control Huh or MCH, IO Control Huh or ICH). The CPU 202 communicates with the chipset 206 via a data bus 208. The working memory 204 communicates with the chipset 206 via a data bus 210. The mass memory 226 communicates with the chipset 206 via a data bus (or I/O bus) 228. The network controller (Ethernet controller) 214 communicates with the chipset 206 via the data bus 216, and communicates with the communication network (Ethernet LAN) 212. A Trusted Platform Module (TPM) 222 providing a root of trust communicates with the chipset 206 via a data bus 224. The BIOS memory is not shown. The chipset 206 further includes the Advanced Management Technology (AMT) circuit 218. The electronic circuits 202, 204, 206, 214, 222 and 218 receive power during normal operation allowing tire PC (or a gaming machine) to securely perform its programmed application functions retrieved from the disk (mass memory 226 may be temporary powered-off when no retrieval of a program is needed) and/or from the network.

Figure 3:
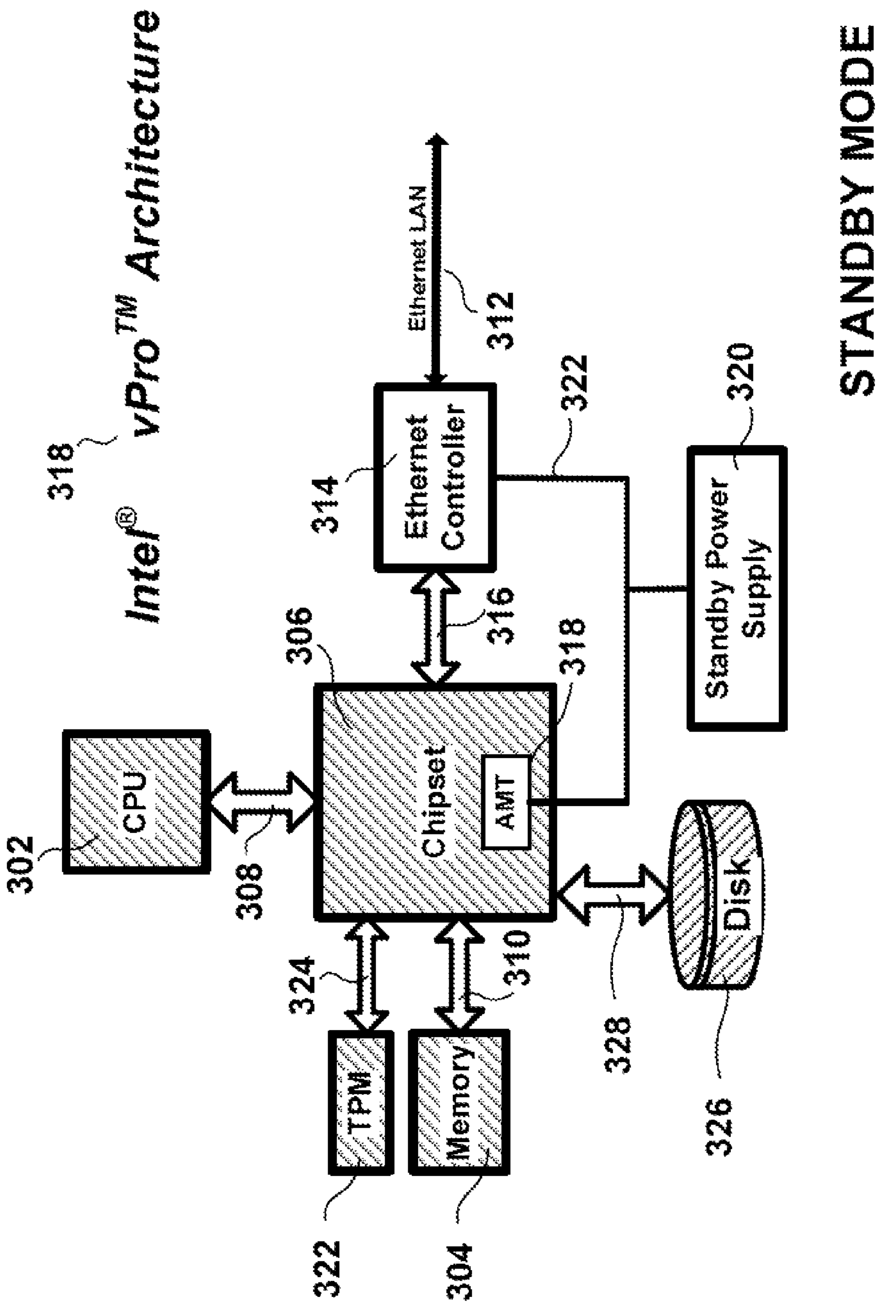
FIG. 3 (Prior Art)
FIG. 3 illustrates the Intel vPro architecture in standby mode.

FIG. 3 illustrates tire Intel® vPro™ architecture in standby mode subsequent to receiving, for example, a "hibernate" or "sleep" command. The circuits 202, 204, 206 and 222 of FIG. 2 are powered off (because the primary power supply is turned off) and are shown, in FIG. 3, in shaded form, as reference numerals 302, 304, 306 and 322, respectively. The mass memory 226 of FIG. 2 is also powered off and shown in FIG. 3 in shaded form at 326. The circuits 314 and 318 remain powered-on by the standby power supply 320 via a power connection 321. The circuits 302, 304, 306 and 322 being inoperative (because they are currently powered down), the PC (or a gaming machine) is unable to perform any programmed application functions retrieved from the disk and/or from the network. Memory 304 may be of the dynamic memory type (e.g. DRAM) and may be placed in a low power mode that includes memory refreshing cycles while receiving power from the standby power supply. However, the AMT circuit 318, still being powered by the standby power supply 320, is still able to communicate with the Ethernet Controller 314 via the bus 316, and carry out some advanced management functions programmed in the AMT. The AMT makes use elaborate System-on-a-Chip (SoC) technology mat comprises a CPU, some memory and input/output interface capabilities (I/O), thereby allowing the PC (or gaming machine) to maintain out-of-band communication on the Ethernet LAN via the Ethernet controller 314 and to facilitate remote out-of-band management of PCs (or gaming machines). The AMT firmware may be stored in the same SPI flash memory (SPI=Serial Peripheral Interface) component used to store the BIOS and is generally updated along with the BIOS. In a typical PC (or gaming machine main game controller) fitted with the Intel® vPro™, power consumption is 200 watts when fully powered up, and 5 watts when in lowest power standby mode.

The functions that may be carried out by a central server via the AMT may include, for example:

Power up, power down, power cycle, and reset the computer;

Redirect the remote computer's boot process, causing it to boot from a network boot image. This allows booting a computer that has a corrupted (or missing) operating system;

Redirect the system's I/O during the boot process, allowing the administrator to view and intervene in the boot process;

Access and change BIOS settings remotely;

Verify that essential software is running on the remote system (for example, anti-virus agents);

Rebuild a corrupted hard drive either over the network or from a local image;

Obtain the remote computer's hardware asset list (platform, baseboard, BIOS, processor, memory, disks, portable batteries, field replaceable units);

Detect suspicious traffic with virus-like and/or worm-like behavior received by or transmitted by the remote system;

Block network traffic to and from systems suspected of infection by viruses or worms;

Manage hardware packet filters and counters in the on-board network adapter; and Receive Platform Even Trap (PET) from the AMT subsystem (for example, events indicating that the operating system is hung, or that a password attack has been, attempted), The capabilities obtained via tire AMT are limited when tire primary power supply is turned-off, as tire main CPU is not operative. Security operations mat require access to the TPM 322 are lost as the TPM 322 is no longer operative when the primary power is turned-off, and secure communication with the central system may be compromised.

Figure 4:
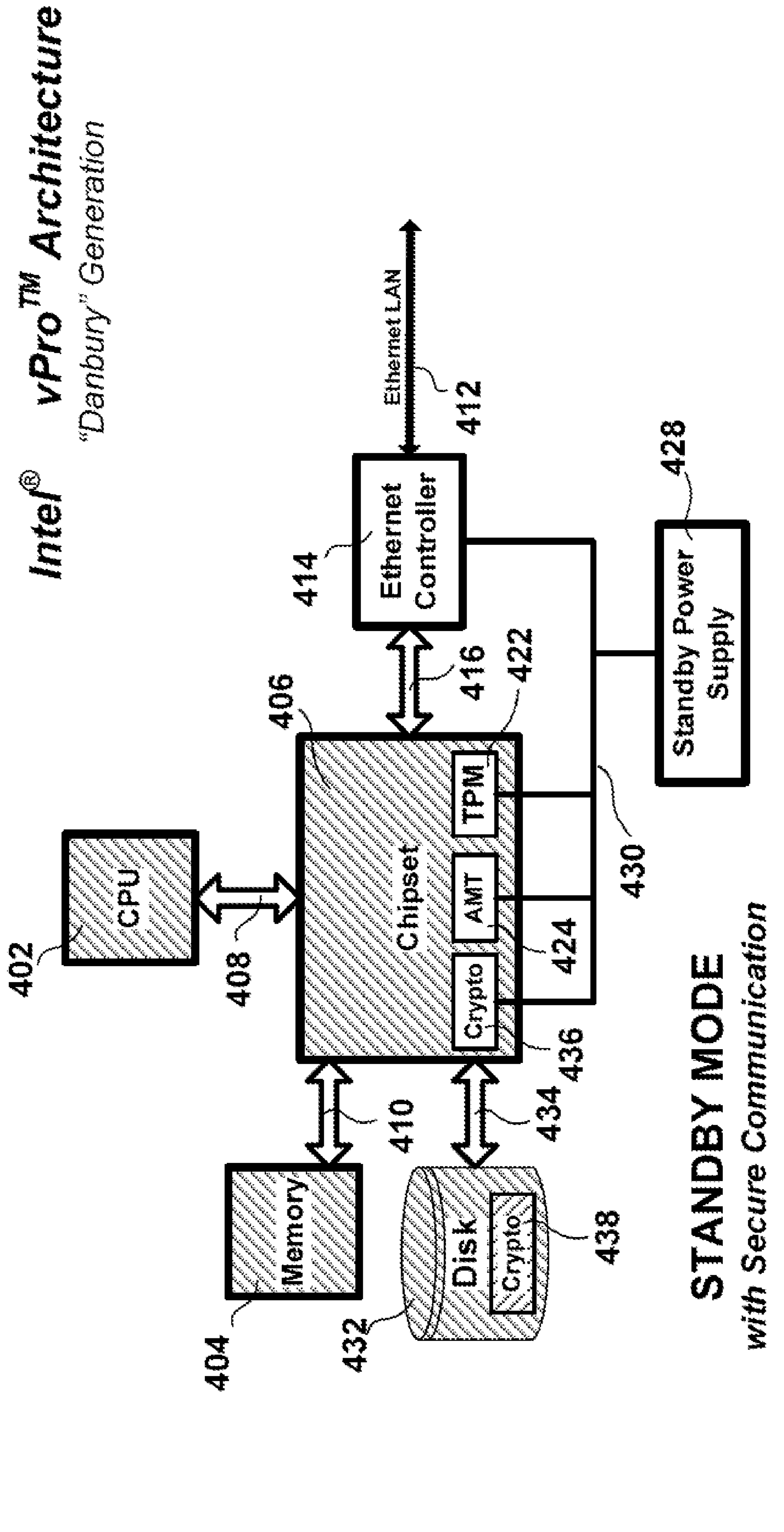
FIG. 4 (Prior Art)
FIG. 4 illustrates the Intel vPro "Danbury" architecture in standby mode.

FIG. 4 illustrates the Intel® vPro™ architecture of the "Danbury" generation in standby mode, that addresses the security limitations of tire previous vPro™ generations. In tire "Danbury" vPro™ generation (and future vPro™ generations), tire TPM 422 is now directly integrated within the chipset 406, and is powered by the standby power supply 428 via the connection 430 when the primary power supply is turned-off. Consequently, the AMT 424 may perform security operations that require access to the TPM even when the primary power supply is turned off.

In addition, the "Danbury" vPro™ generation includes a cryptographic circuit 436 that is integrated within the chipset 406 to accelerate cryptographic functions even when the primary power supply is turned off. In particular, cryptographic circuit 436 may encrypt and decrypt data to/from the disk 432 on the fly, without ever exposing cryptographic secrets in tire working memory 404, avoiding "memory attacks" such as "freezing" the memory with a coolant prior to power-off to freeze its content and enabling reading of its content on an unauthorized computer to recover the secrets using elaborate search algorithms. Microsoft Bitlocker drive encryption (prior to the availability of the "Danbury" vPro™ generation and use of tire cryptographic circuit 436 and TPM 422) is susceptive to "memory attacks". For further protection against "off-line" attacks and "memory attacks", a disk 432 comprising an integrated cryptographic circuit 438 may be used.

Gaming machines including Intel® "Danbury" vPro™ generation technology, or equivalent technology from other computer circuit manufacturers, may allow a casino management system to continually perform security verifications with a very high degree of trust via the communication network 412 even when the gaming machines are turned-off (i.e., when the primary power supply is turned off). Low power circuits powered by the standby power supply and communicating with the AMT may be provided to detect physical intrusion of the gaming machine (door open, tilt, for example) and allow the forwarding of an alert signal to tire casino management system even when, the primary power of the gaming machine is turned off. The standard "PC Case Opened" signal may be used to detect intrusion while the gaming machine is in standby mode.

Figure 5:
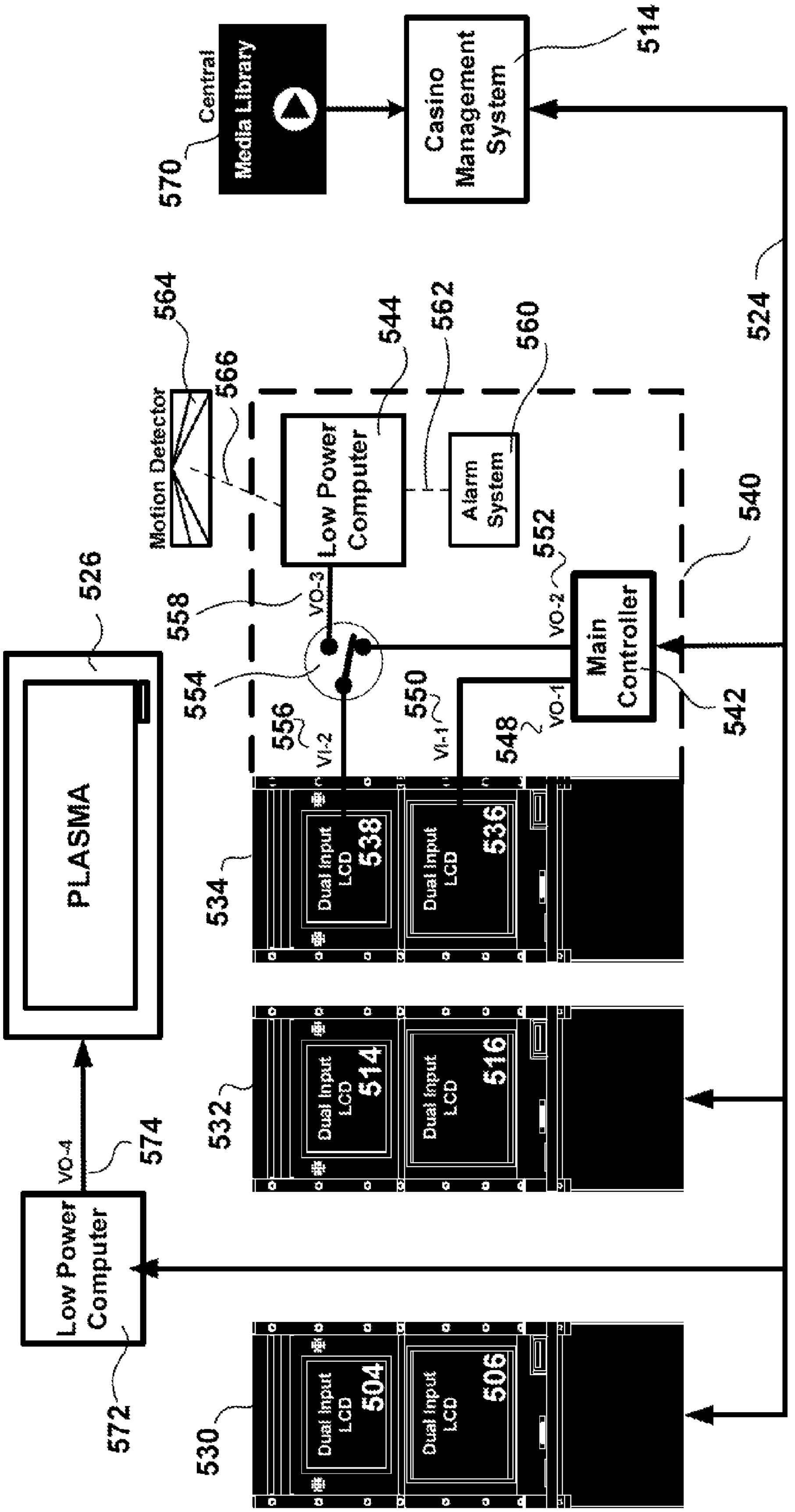
FIG. 5 demonstrates how TES gaming machines are configured to run promotional content and attract players while consuming very little energy, according to embodiments of the present invention.

FIG. 5 demonstrates how TES gaming machines according to embodiments of tire present invention are configured to run promotional content and attract players while consuming little energy (i.e., significantly less than, the gaming machine would consume if fully powered on). Tire TES gaming machines referenced at 530, 532, 534 (shown in black to indicate that their respective main power supplies have been turned off) may include at least one dual input display, as shown at 504, 506, 514, 516, 536 and 538. Dual-input displays are commonly found in consumer LCD monitors, and allow the video signal to be switched between a first video input and a second video input. The inputs may be (for example, the present inventions not being limited to such standards) VGA, DVT or HDMI, or a combination thereof. The video sources may originate from the video card of two separate computers (e.g., PCs), or the video output of a PC and the video output of an embedded lower power computer device (e.g. WinCE device. Embedded Linux device and a media player device).

The TES gaming machines 530, 532 and 534 represented in FIG. 5 may be identical or may include at least functionally similar structures that enable them to function in trusted energy saving mode, according to an embodiment of the present invention. The internal components of such TES-enabled gaming machine 534 are represented at 540 and are described hereafter. Referring to gaming machine 534, at least one of the video displays 536 and 538 includes dual-video input capability. In FIG. 5, video display 538 includes a dual input switching capability, as symbolically represented at 554. As shown within 540, TES gaming machine 534 may include a main game controller 542 and a low power computer device 544 (e.g., a WinCE device, Embedded Linux device and a media player device). The low power computer 544 is powered by the standby power supply (not shown in FIG. 5) when the primary power supply (also not shown in FIG. 5) is turned off. The main game controller 542 enables a player to wager on a game and includes (a) a first video output 548 (labeled in FIG. 5 as VO-1) for displaying elements of the game on the lower video display 536 via a corresponding first video input 550 (labeled in FIG. 5 as VI-1), and (b) a second video output 552 (labeled in FIG. 5 as VO-2) for displaying elements of the game on the upper video display 538 via a corresponding first video input 556 (labeled in FIG. 5 as VI-2). The low power computer 544 includes a video output 558 (labeled in FIG. 3 as VO-3). Video display 538 includes a dual video input 556 (labeled as VI-2 in FIG. 5) that can be switched at 554 between the second video output (VO-2) 552 and the third video output (VO-3) 558. In the exemplary configuration shown in FIG. 5, the video switch 554 enables video output to be shown on the top video display 538 via video input (VI-2) 556. The main game controller 542 may include the vPro™ "Danbury" technology (or functionally similar technology) described relative to FIG. 4. When the primary power supply is turned off, the switch 554 for video display 538 may automatically be switched from the second video output VO-2 552 of the main controller 542 to the third video output VO-3 558, which is the video output of the low power embedded computer 544. As tire main game controller 542 of the gaming machine includes the vPro™ "Danbury" (or functionally similar technology), "out-of-band" secure network communication with the casino management system 514 is retained when the primary power supply is turned off (and the standby power supply remains on to supply the necessary electronic circuits). According to embodiments of the present invention, the casino management system 514 has the ability to rapidly wake-up (i.e., rapid boot) the turned-off main game controller 542 via the network 524 with the assurance that the main game controller 542 has not been compromised. Consequently, the lengthy verification required by gaming regulation each time a gaming machine starts up may be waived, which enables the gaming machine to be quickly available for player game play (i.e., more quickly than would be the case had the gaming machine have been required to go through the lengthy verifications mandated by gaming regulations each time a gaming machine powers up). When the primary power supply is turned back on as the gaming machine is woken up, the switch 554 for the gaming machine's video display 538 may be automatically switched from the video output VO-3 of the low power computer 544 to the second video output VO-2 552 of the main game controller 542. An alarm system 560 may be coupled to the low power computer 544 via the interface 562 to provide intrusion detection and alerts when the primary power supply is turned off. A motion detector 564 may be coupled to the low power computer 544 via the interface 566 to provide a wake-up signal when a player is near or approaches a powered down (i.e. the primary power supply is turned off and the standby power supply is powering tire low power computer 544) TES gaming machine. The wakeup signal (not shown) may turn on the primary power supply that will enable the main controller 542 to boot, thereby returning the TES gaming machine to full operation with the assurance that security was not compromised and allowing a player to rapidly start a wager on a game.

When the TES gaming machine 534 is powered down (i.e. the primary power supply is turned off and the standby power supply is powering tire low power computer 544), the low power computer 544 (having its video output 558 switched by 554 to the upper video display 538 via VI-2 556) may advantageously display promotional video content (and/or any other content) to attract players nearby players. A player interested by the video content displayed on tire display 538 of an otherwise powered down gaming machine 534 may approach the TES gaming machine 534 and consequently trigger the motion detector 564 to wake up the TES gaming machine 534, which may then boot to full operation (with assurance that security was not compromised), and advantageously, immediately display tire game promoted when tire trigger occurred such that tire player is ready to play tire game that attracted him. Alternatively, a menu of the last few games promoted (the last past 5 games for example) may be displayed such the player may quickly pick one of the games that attracted him or her in the first place, but that was no longer displayed when the motion detector triggered the wake-up of tire gaming machine. Alternatively still, a menu of all available games may be displayed to the player. The upper video display 538 may be turned off by the low power computer 544 for further power saving and be turned on as soon as activity is detected by the motion detector or upon a command from the low power computer 544. The low power computer 544 may receive a command to turn off or turn-on the upper video display 538 from the casino management system, while the primary power supply is turned-off (and tire standby power supply in turned-on).

The promotional or other video content displayed by tire low power computer 544 to tire upper video display 538 while the TES gaming machine 534 was powered-off may be read from a local mass storage (not shown) coupled to the low power computer 544, or alternatively, may be streamed via the network 524 from a central or otherwise remote media library 570, tire low power computer 544 including a network interface (not shown) also coupled to tire network 524. The promotional video content may be tagged such that the name of tire game currently displayed is available to the software running on the low power computer 544, who may men forward such information to tire main controller 542 upon motion detection, triggered wake-up to enable the main controller 542 to determine which game or menu composition to present to tire player that triggered tire motion detector 564 and mat may now be standing in front tire gaming machine.

The promotional content displayed while the TES gaming machine is in trusted energy saving mode (i.e. the primary power supply is turned-off and the standby power supply is powering the low power computer) according to an embodiment of tire present invention, may include (but is not limited to), for example, hospitality promotions, food and beverage promotions, game promotions, and third partly advertising.

The TES Gaming machines 530, 532 and 534 may receive configuration parameters from the casino management system 514, such configuration parameters controlling the behavior of the gaming machines, particularly with respect to their power up/power down strategies. Depending on operator preference, powered-down TES gaming machines may be triggered to wake-up from when one or more motion detectors 564 are triggered and may be configured to power down when no motion is detected from one or more of such motion detectors 564 for an operator-configurable period of time. That is, TES gaming machines may intelligently power up or power down based on activity registered within one or more areas on the gaming floor. Further information about how motion detectors may be used within the present Trusted Energy Savings model is presented hereunder relative to FIG. 8.

Large Plasma or LCD screens 526 may overhang banks of gaming machines and run additional promotional material. These screens may receive a video output signal VO-4 574 generated by a low power computer 572 coupled to the network 524. This second low power computer 572 may be similar or identical to the low power computer 544, and receive media and instructions from the Casino Management System 514 via the network 524 and/or may utilize locally stored media and/or instructions. The second low power computer 572 may turn the plasma display 526 on and off for saving power according to instructions or rules stored in its memory or upon a command received from the casino management system 514 via the network 524. The casino management system may send power saving rules and commands to the TES gaming machines 530 532 534 and the overhand plasma 526 (via second low power computer 572) such as to obtain a coherent power savings scheme, a coherent promotional scheme and a set of fully operational gaming machines in accordance with a coherent strategy and the activity observed on the casino floor.

Figure 6:
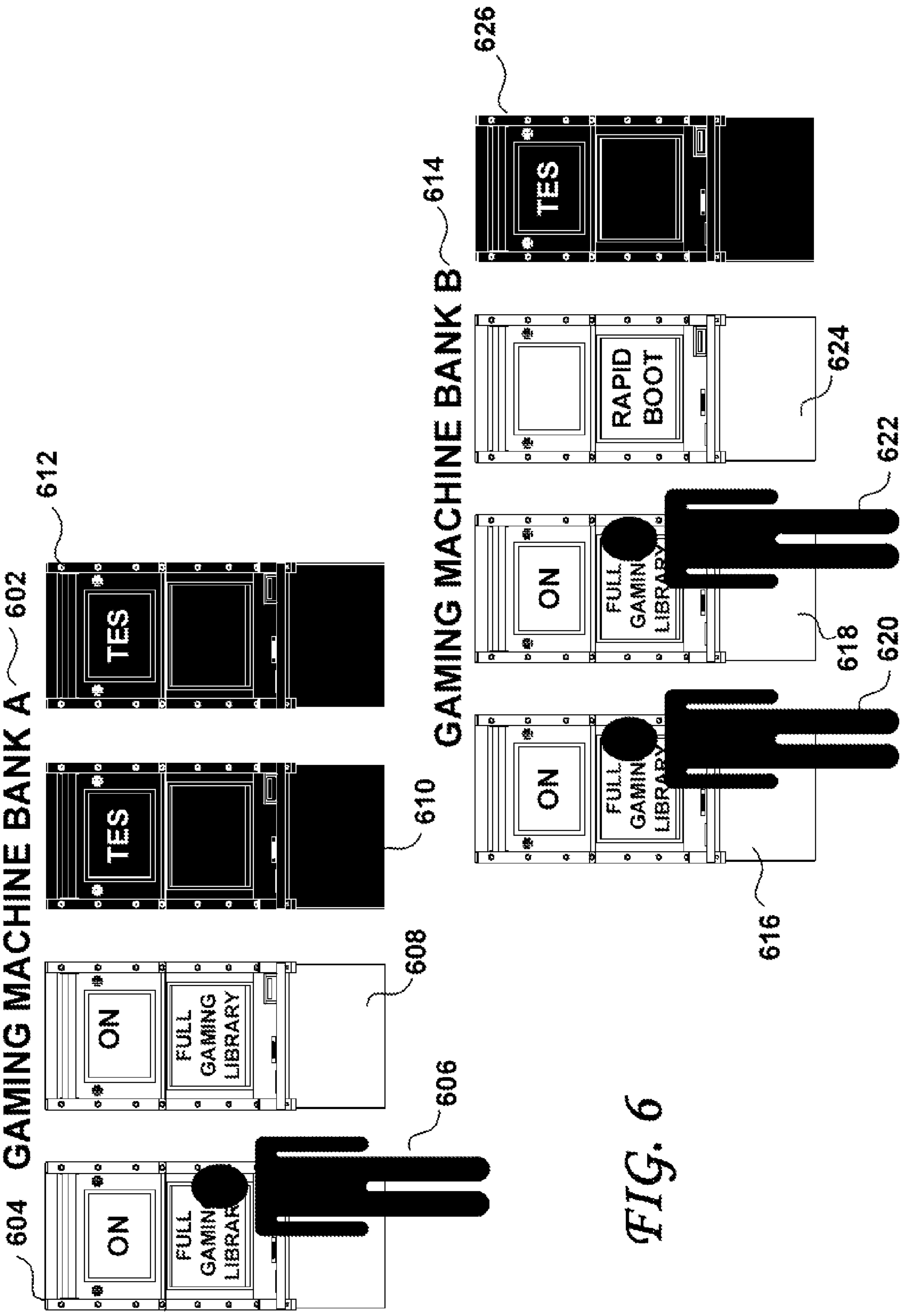
FIG. 6 demonstrates one possible TES gaming model in which gaming machines anticipate play based on current occupancy, according to embodiments of the present invention.

FIG. 6 demonstrates one possible TES gaming model according to an embodiment of the present invention in which gaming machines anticipate play based on current occupancy. Gaming Machine Bank A 602 features a bank of gaming machines in which only one gaming machine 604 is in use by a player 606, but in which a second gaming machine 608 is powered on to accommodate any new player who might approach. This exemplary model works as follows: banks of gaming machines always power up one more gaming machine than is currently in use and powers down any remaining gaming machines (wherein the powered down gaming machines run in a TES-enabled mode, where promotional content may run on one or more screens). Whenever a player plays a previously unused gaming machine in this model, another gaming machine within the bank of gaming machines powers up automatically. For example, were a player to join Gaming Machine Bank A 602 and begin play on gaming machine 608, then gaming machine 610, currently miming in a powered down TES-enabled mode, would begin to boot rapidly. Likewise, if another player were to begin playing on next adjacent gaming machine 610, gaming machine 612, also running only in TES-enabled mode, would begin its own rapid boot process, so as to be readily available to other potential players.

This model is further illustrated in Gaming Machine Bank B, referenced in FIG. 6 at 614. Gaming machine 616 is being played by player 618 and player 622 has just begun playing on gaming machine 620. Responsive to this action, gaming machine 624 has begun its rapid boot process. If either player 618 or player 622 were to end his gaming session, gaming machine 624 would automatically power down if no one has started game play on it. In this exemplary and illustrative scenario, gaming machine 626 remains powered down. If a new player were to approach gaming machine 624, and players 618 and 622 continued play on their gaming machines, then gaming machine 624 would begin to rapid boot. Those of skill in this art will readily recognize that many different variations on this exemplary model are possible. All such variations are deemed to fall within the purview of the purview of the present application.

The TES gaming machines making use of the vPro™ "Danbury" technology (or equivalent) described relative to FIG. 4, retain "out-of-band" secure network communication with the casino management system 514 even when their respective primary power supplies are turned-off, thereby ensuring that security has not been compromised.

It should be noted that gaming machines may display one or more user-friendly messages while in rapid boot mode. These messages may be user configurable and may also contain promotional content.

Figure 7A:
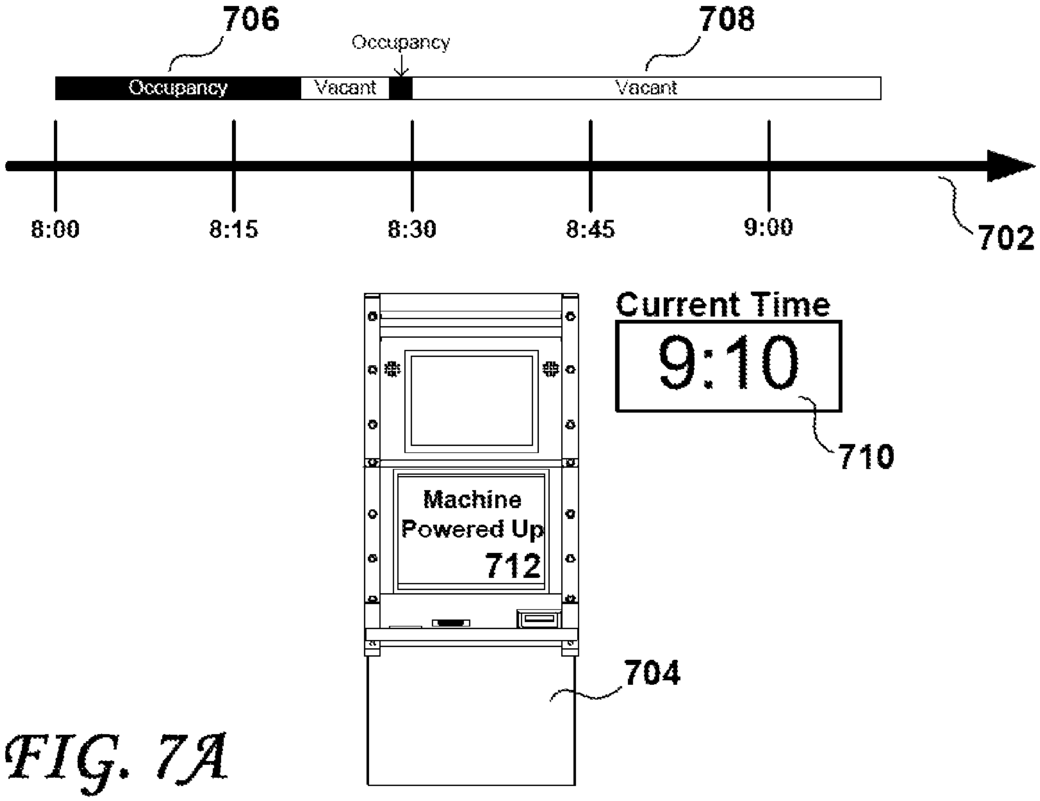
FIG. 7A demonstrates a first possible scenario within a TES gaming model in which gaming machines use previous play history to anticipate future play, according to embodiments of the present invention.

FIG. 7A demonstrates a first possible scenario within a TES gaming model according to embodiments of the present invention in which gaming machines keep a historical record of past play and use that record to anticipate future play. In this example, a play timeline 702 is provided for a TES enabled gaming machine 704. On the timeline, periods of player occupancy (i.e. periods during which the player is engaged in actual play) on the depicted gaming machine are marked in black as shown at 706 and periods of player vacancy (i.e., periods of time in which the gaming machine is not being used) are marked in white, as shown at 708. An intelligent control scheme within a TES architecture according to embodiments of the present invention may utilize such occupancy metrics to regulate the future behavior of the gaming machine. For example, an operator may configure the TES gaming machine on his floor to behave as follows:

A. If within the last 30 minutes the gaming machine has less than 15% occupancy, shut it down after 10 minutes of non-occupancy time.
B. If within the last 30 minutes the gaming machine has between 15% and 40% occupancy, shut it down after 20 minutes of non-occupancy time.
C. If within the last 30 minutes the gaming machine has 40% occupancy or greater, shut it down after 60 minutes of non-occupancy time.

Following the sample behavior instructions outlined above, an exemplary scenario using timeline 702 and gaming machine 704 may be examined in more detail. The current time in FIG. 7A is 9:10, as shown at 710. In the window of time between 8:00 and 8:30, tire gaming machine had 75% occupancy. This usage profile would put the gaming machine in category "C" meaning that the gaming machine should not power down until it experiences 60 minutes or more of inactivity. Because gaming machine 704 at 9:10 has only experienced 40 minutes of inactivity (no one has played gaming machine 704 between 8:40 and 9:10) it will remain in a powered up state for another 20 minutes assuming no play. This fully powered up status 712 is reflected on the depicted gaming machine 704 in FIG. 7A.

Figure 7B:
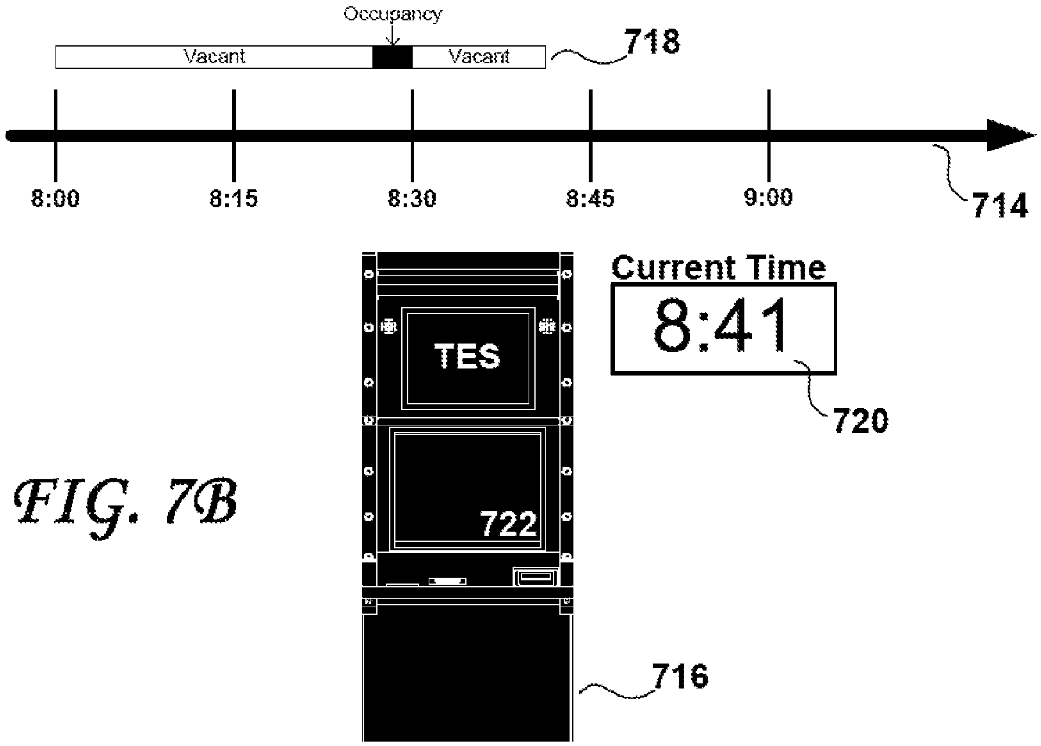
FIG. 7B demonstrates a second possible scenario within a TES gaming model in which gaming machines use previous play history to anticipate future play, according to embodiments of the present invention.

FIG. 7B demonstrates a second possible scenario within a TES gaming model according to embodiments of the present invention, in which gaming machines use previous play history to anticipate future play. In this second example, a second play timeline 714 is provided for a second TES-enabled gaming machine 716. The occupancy figures 718 on gaming machine 716 are not as favorable for the operator as the metrics were for gaming machine 704. The current time in FIG. 7B is 8:41, as shown at 720. Between 8:00 and 8:30, gaming machine 716 has only achieved 12.5% occupancy rate. This usage profile would put the gaming machine in category "A," meaning that it should power down after only 10 minutes of non-use. Because the gaming machine has not been played in 11 minutes (it has been vacant between 8:30 and 8:41), the gaming machine must enter a powered down TES state. This TES status 722 is reflected on the depicted gaming machine in FIG. 7B.

Figure 8:
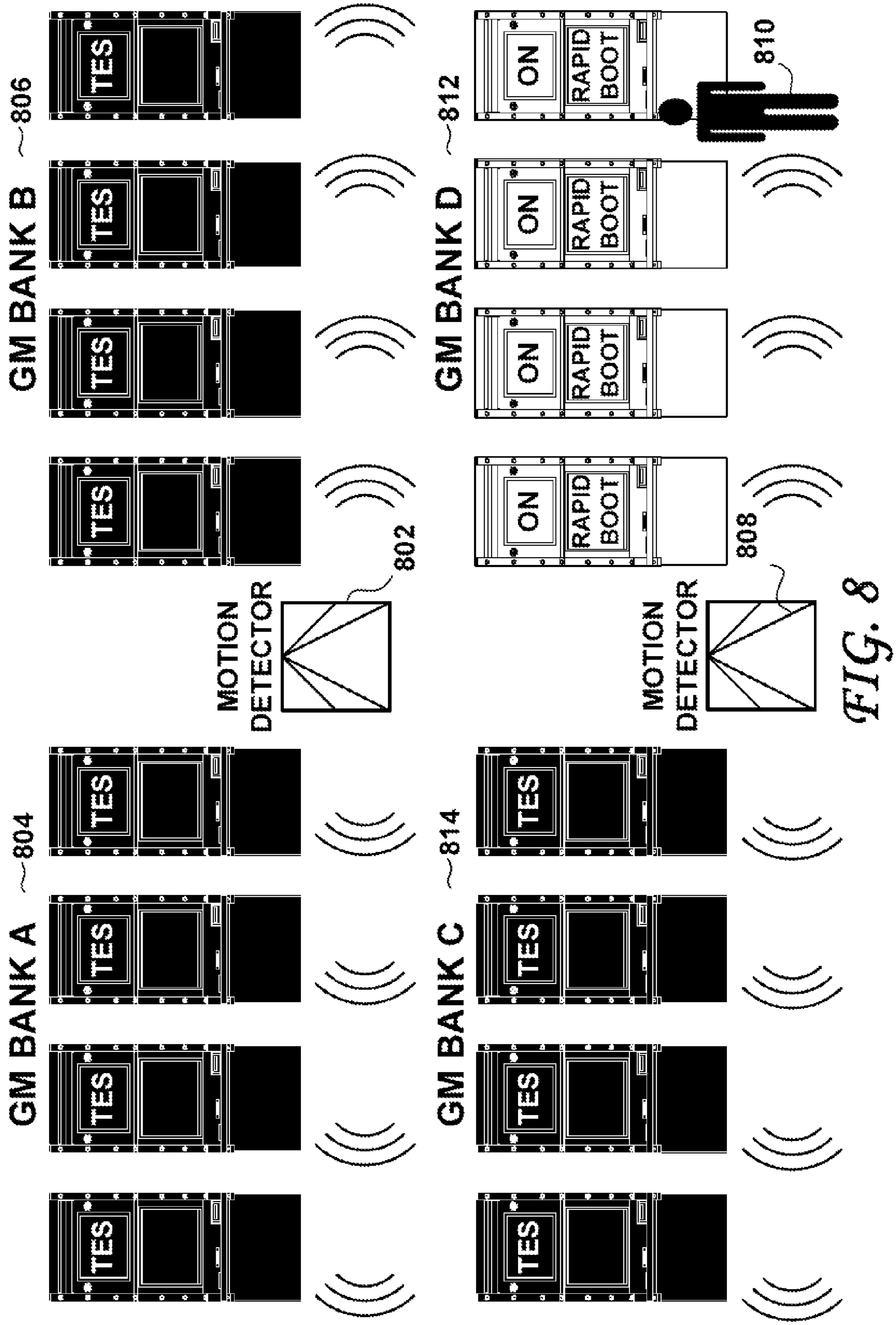
FIG. 8 demonstrates one possible TES gaining model in which gaming machines use motion detectors to anticipate play, according to embodiments of the present invention.

FIG. 8 demonstrates one possible TES gaming model in which gaming machines use motion detectors to anticipate play, according to further embodiments of the present invention. Instead of waiting for players to start a game at a gaming machine to trigger tire power up of new nearby gaming machines, this model powers up gaming machines based on detecting the presence of players approaching. For example, because Motion Detector 802 detects no activity, the banks of gaming machines associated therewith; namely, Game Machine Bank A 804 and Gaming Machine Bank B 806, remain in a powered down, TES-enabled mode. In contrast, because Motion Detector 808 detects the presence of a player 810 in the vicinity of Game Bank D 812, the gamine gaming machines in Gaming Machine Bank D all begin to boot rapidly. Because the Motion Detector did not detect the presence of a player in the vicinity of the gaming machines in Gaming Machine Bank C 814, the gaming machines in that bank remain in a powered down, TES-enabled mode. In this model, therefore, entire banks of gaming machines may be woken up upon detection of a player approaching. Again, many different variations are possible, and all such variations are included within the scope of the present inventions.

Indeed, it should be noted that a hybrid approach, in which selected aspects of several of the above-described player anticipation models are combined, is also possible. For example, all gaming machines may default to a powered off, TES-enabled state and then, whenever a motion detector detects the presence of a player in the vicinity of a game bank, only one of the gaming machines boots rapidly. If a player begins play on that gaming machine, then a second gaming machine boots up. Such a hybrid motion detector/current occupancy model could be extended such that one more gaming machine than is currently in use within a bank of gaming machines is always powered up, and such that if all players abandon a bank of gaming machines and the motion detectors detect no activity, then all gaming machines in the bank return to a powered off TES-enabled state until tire motion detector detects another player.

It should also be noted that, as used herein, the phrase "motion detector" is explicitly meant to encompass a variety of possible detection strategies. Technologies including but not limited to passive infrared sensors (PIR), ultrasound sensors, microwave sensors, floor pressure detectors, security video cameras (with motion detection algorithms processing the video signals) and voice detection via microphones may all be advantageously used to detect approaching players or other actions within the vicinity of a TES-enabled gaming machine or within the vicinity of a bank of TES-enabled gaming machines. The motion detection may be processed at the gaming machine, by a bank controller, by a vicinity controller or by the central security surveillance system (with motion detection algorithms processing the surveillance video signals). A wake up signal may be forwarded to a TES-enabled gaming machine via any device or central system (including the casino management system 514) connected to the network 524.

While the foregoing detailed description has described several embodiments of this invention, it is to be understood that the above description is illustrative only and not limiting of the disclosed invention. For example, while TES slot gaming machines were described, TES video poker, video keno, video roulette, video craps, and video bingo games are also possible. The mapping of the TES gaming machines that are turned-on and in low-power mode may be periodically forwarded (via the network, for example) to the air-conditioning management system that may optimize the prediction for cooling, heating and ventilation. The mapping of the TES gaming machines mat are turned-on and in low-power mode may be periodically forwarded (via the network, for example) to the lighting management system that may adapt the lighting accordingly (e.g. reduce the intensity of lighting above gaming machines that are in standby mode). Indeed, a number of modifications will no doubt occur to persons of skill in this art. All such modifications, however, should be deemed to fall within the scope of the present invention.

The invention claimed is:

1. A gaming machine, comprising:

a game controller and an interactivity apparatus to accept wagers from a player and to provide random outcomes while playing a game, the interactivity apparatus including a first video display;

a primary power supply configured to provide power to the game controller;

a first mode in which the gaming machine draws power only from the primary power supply and in which the gaming machine is fully powered up and available for immediate game play;

a first communication channel that is configured to maintain communication between the gaming machine and a remote computer when the gaming machine is in the first mode;

a secondary power supply that is separate from and independent of the primary power supply;

a second mode in which the gaming machine turns off the primary power supply while maintaining power from the secondary power supply and consumes less power than in the first mode, the gaming machine is not available for immediate game play in the second mode;

a second communication channel that is separate from and independent of the first communication channel, the second communication channel being configured to maintain communication between the gaming machine and the remote computer when the gaming machine is in the second mode, and at least one of logic and circuitry for activating the first mode and the second mode, the second mode activated when the gaming machine is not being actively played.

2. The gaming machine of claim 1, wherein the first communication channel and the second communication channel are provided on a same physical cabling.

3. The gaming machine of claim 1, further including a low power computer that is separate from and independent of the game controller, the low power computer being powered by the second power supply.

4. The gaming machine of claim 3, wherein the first video display includes a first video input port and a second video input port.

5. The gaming machine of claim 4, wherein the game controller is configured to be coupled to the first video input port of the first video display when the gaming machine is in the first mode.

6. The gaming machine of claim 4, wherein the low power computer includes a video output that is configured to be coupled to the second video input port of the first video display when the gaming machine is in the second mode.

7. The gaming machine of claim 1, wherein the gaming machine is further configured to receive, over the second communication channel, a command instructing the gaming machine to switch from the second mode to the first mode and, responsive to receiving the command, to switch, from the second mode to the first mode.

8. The gaming machine of claim 3, further comprising an alarm system coupled to the low power computer, the alarm system being configured to detect intrusions and to provide alerts upon detection thereof when the gaming machine is in at least one of the first mode and the second mode.

9. A gaming machine, comprising:

a game controller and an interactivity apparatus to accept wagers from a player and to provide random outcomes while playing a game, the interactivity apparatus including a first video display;

a primary power supply configured to provide power to the game controller;

a first mode in which the gaming machine draws power only from the primary power supply and in which the gaming machine is fully powered up and available for immediate game play;

a first communication channel that is configured to maintain communication between the gaming machine and a remote computer when the gaming machine is in the first mode;

a secondary power supply that is separate from and independent of the primary power supply;

a second mode in which the gaming machine draws power only from the secondary power supply and consumes less power than in the first mode and in which the gaming machine is not available for immediate game play;

a second communication channel that is separate from and independent of the first communication channel, the second communication channel being configured to maintain communication between the gaming machine and the remote computer when the gaming machine is in the second mode, at least one of logic and circuitry for selectively activating the first mode and the second mode; and a detector configured to trigger when a player approaches or is near the gaming machine, the gaming machine being further configured to switch from the second mode to the first mode when the detector detects that a player is approaching or is near the gaming machine.

10. The gaming machine of claim 3, wherein the low power computer is configured to cause the first video display to display content when the gaming machine is in the second mode.

11. The gaming machine of claim 3, wherein the low power computer is further coupled to a second video display disposed adjacent to the gaming machine, the low power computer being configured to cause the second video display to display content when the gaming machine is in the second mode.

12. The gaming machine of claim 9, wherein when the gaming machine is in the second mode, the first video display is configured to display previews of games that are available on the gaming machine, and wherein the gaming machine is further configured to enable game play of a game whose preview was shown on the first video display when the detector was triggered.

13. The gaming machine of claim 9, wherein when the gaming machine is in the second mode, the first video display is configured to display previews of games that are available on the gaming machine, and wherein the gaming machine is further configured to show a menu of a predetermined number of the last games whose preview's were shown on the first video display when or shortly before the detector was triggered.

14. The gaming machine of claim 9, wherein when the gaming machine is in the second mode, the first video display is configured to display previews of games that are available on the gaming machine, and wherein the gaming machine is further configured to show a menu of games available on the gaming machine when the detector is triggered.

15. A method, comprising:

providing a gaming machine, the gaming machine comprising a game controller and an interactivity apparatus to accept wagers from a player and to provide random outcomes while playing a game, the interactivity apparatus including a first video display;

providing a primary power supply configured to provide power to the game controller and providing a secondary power supply that is separate from and independent of the primary power supply;

selecting between a first mode in which the gaming machine draw's power from the primary power supply and in which the gaming machine is fully powered up and available for immediate game play and a second mode in which the gaming machine turns off the primary power supply while maintaining power from the secondary power supply and consumes less power than in the first mode and in which the gaming machine is not available for immediate game play, the second mode enabled when the gaming machine is not being actively played;

enabling a first communication channel when the gaming machine is in the first mode, the first communication channel being configured to maintain communication between the gaming machine and a remote computer when the gaming machine is in the first mode, and enabling a second communication channel when the gaming machine is in the second mode, the second communication channel being separate from and independent of the first communication channel, the second communication channel being configured to maintain communication between the gaming machine and the remote computer when the gaming machine is in the second mode.

16. The method of claim 15, further comprising a step of providing the first communication channel and the second communication channel on a same physical cabling.

17. The method of claim 15, wherein the gaming machine providing step is carried out with the gaming machine further including a low power computer that is separate from and independent of the game controller, the low power computer being powered by the second power supply.

18. The method of claim 17, wherein the gaming machine providing step is carried out with the first video display including a first video input port and a second video input port.

19. The method of claim 18, further including a step of coupling the game controller to the first video input port of the first video display when the gaming machine is in the first mode.

20. The method of claim 18, wherein the low power computer includes a video output and wherein the method further includes a step of coupling the video output to the second video input port of the first video display when the gaming machine is in the second mode.

21. The method of claim 15, further comprising the steps of receiving, over the second communication channel, a command instructing the gaming machine to switch from the second mode to the first mode and, responsive to receiving the command, switching from the second mode to the first mode.

22. The method of claim 17, wherein the gaming machine providing step is carried out with the gaming machine further comprising an alarm system coupled to the low power computer, and wherein the method further comprises the step of the alarm system detecting intrusions and providing alerts upon detection thereof when the gaming machine is in at least the second mode.

23. A method, comprising:

providing a gaming machine, the gaming machine comprising a game controller and an interactivity apparatus to accept wagers from a player and to provide random outcomes while playing a game, the interactivity apparatus including a first video display;

providing a primary power supply configured to provide power to the game controller and providing a secondary power supply that is separate from and independent of the primary power supply and providing a detector configured to trigger when a player approaches or is near the gaming machine;

selecting between a first mode in which the gaming machine draw's power from the primary power supply and in which the gaming machine is fully powered up and available for immediate game play and a second mode in which the gaming machine draws power only from the secondary power supply and consumes less power than in the first mode and in which the gaming machine is not available for immediate game play;

enabling a first communication channel when the gaming machine is in the first mode, the first communication channel being configured to maintain communication between the gaming machine and a remote computer when the gaming machine is in the first mode, enabling a second communication channel when the gaming machine is in the second mode, the second communication channel being separate from and independent of the first communication channel, the second communication channel being configured to maintain communication between the gaming machine and the remote computer when the gaming machine is in the second mode; and switching from the second mode to the first mode when the detector detects that a player is approaching or is near the gaming machine.

24. The method of claim 17, further comprising a step of the low power computer causing the first video display to display promotional material when the gaming machine is in the second mode.

25. The method of claim 17, further comprising the steps of providing a second video display adjacent to the gaming machine and coupling the low power computer to the second video display, and configuring the low power computer to cause the second video display to display promotional material when the gaming machine is in the second mode.

26. The method of claim 23, wherein when the gaming machine is in the second mode, the method further includes steps of displaying, on the first video display, previews of games that are available on the gaming machine, and enabling game play of a game whose preview was shown on the first video display when the detector was triggered.

27. The method of claim 23, wherein when the gaming machine is in the second mode, the first video display is configured to display previews of games that are available on the gaming machine, and wherein the gaming machine is further configured to show a menu of a predetermined number of the last games whose previews were shown on the first video display when or shortly before the detector was triggered.

28. The method of claim 23, wherein when the gaming machine is in the second mode, the first video display is configured to display previews of games that are available on the gaming machine, and wherein the gaming machine is further configured to show a menu of games available on the gaming machine when the detector is triggered.

29. The gaming machine of claim 1, wherein the primary power supply and the secondary power supply each receive power from the gaming facility main power.

30. The gaming machine of claim 1, wherein the primary power supply and the secondary power supply each receive power from the same source.

31. The method of claim 15, wherein the primary power supply and the secondary power supply each receive power from the same source.

32. The gaming machine of claim 1, wherein the primary power supply and the secondary power supply each receive power from the same source.

* * * * *